United States Patent [19]

Belmore

[11] 4,117,694

[45] Oct. 3, 1978

[54] ROTATABLE REFRIGERATED VALVE

[76] Inventor: Richard J. Belmore, 2 Francis Dr., Randolph, Mass. 02368

[21] Appl. No.: 767,158

[22] Filed: Feb. 9, 1977

[51] Int. Cl.² .............................................. B01D 5/00
[52] U.S. Cl. ............................... 62/55.5; 55/DIG. 15; 137/340; 251/315
[58] Field of Search ................. 62/55.5, 100, 268; 55/DIG. 15, 269; 137/340; 251/315

[56] References Cited
U.S. PATENT DOCUMENTS

| | | | |
|---|---|---|---|
| 2,890,017 | 6/1959 | Shafer | 137/340 |
| 3,014,491 | 12/1961 | Reynaud | 137/340 |
| 3,019,809 | 2/1962 | Ipsen et al. | 137/340 |
| 3,636,972 | 1/1972 | Scaramucci | 137/340 |
| 3,647,344 | 3/1972 | Skibo et al. | 137/340 |

Primary Examiner—Ronald C. Capossela

[57] ABSTRACT

A ball valve for use in a vacuum pumping system has the passage through the valve element provided with a series of metal plates disposed for contact by gas passing through the valve when open. A refrigerant conduit entering the passage through the neck of the valve element by which it is turned between open and closed positions includes a U-shaped portion within the passage with which the plates are in thermal contact and the conduit then exits through the neck. The valve casing has sealed clean-out ports through which the passage is accessible when the valve is closed thus permitting the thus established cold trap to be serviced without losing vacuum in the chamber being exhausted, the valve monitored, and the passage rough-pumped.

9 Claims, 6 Drawing Figures

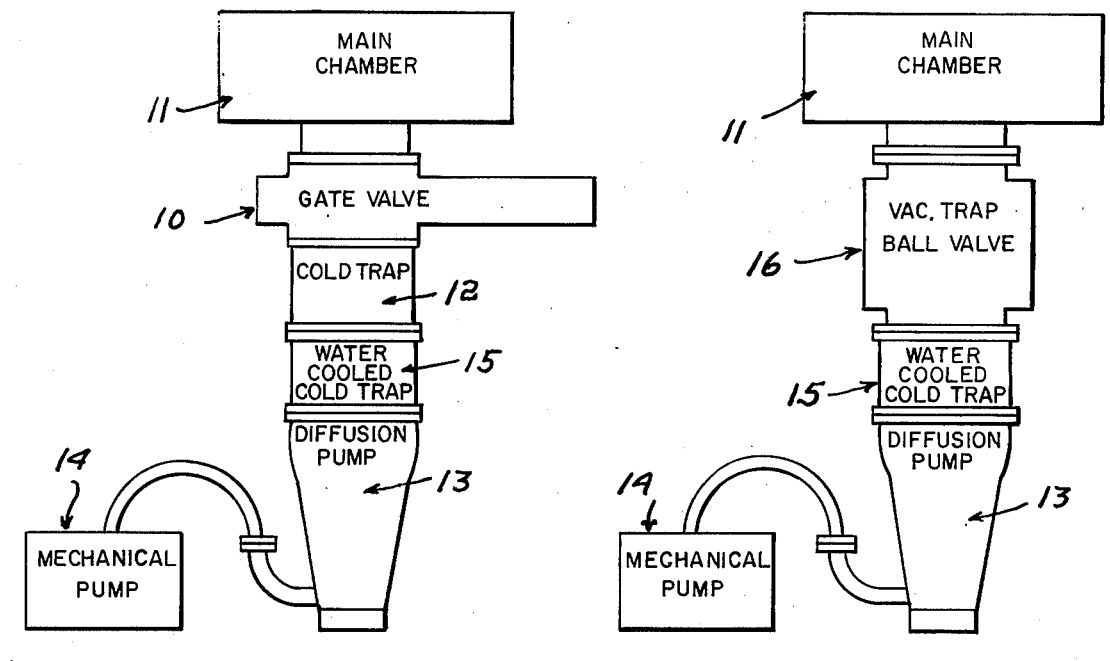
Fig. 1 PRIOR ART
Fig. 2
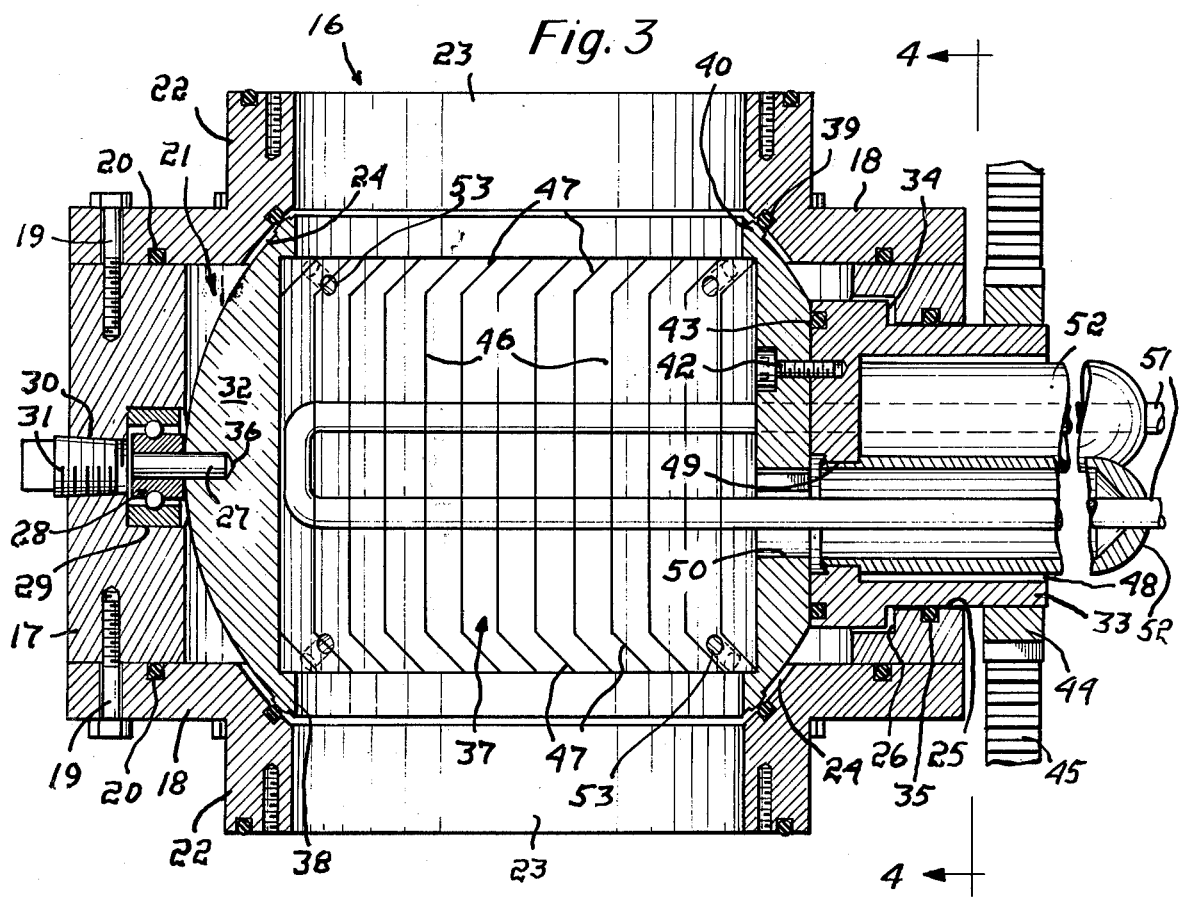
Fig. 3

ROTATABLE REFRIGERATED VALVE

BACKGROUND OF THE INVENTION

By way of an example of the problems with which the invention is concerned, a standard diffusion pumping system has a gate valve between the main chamber to be evacuated and a cold trap and a water cooled cold trap between the cold trap and the diffusion pump which is backed by a mechanical vacuum pump.

A gate valve has large areas to be exhausted and typically includes castings which are costly to machine and if not machined present rough surfaces interfering with pumping efficiency.

THE PRESENT INVENTION

The general objective of the present invention is to provide a valve that, while useful in other systems, is particularly well adapted for use in vacuum pumping systems and that not only are free of the previously noted deficiencies but also include means meeting other requirements, particularly that of providing a cold trap.

In accordance with the invention, this general objective is attained with a rotatable valve, herein disclosed as a ball valve, the valve element of which has a passage of substantial axial extent effecting communication between the inlet and outlet ports of the valve casing when the valve member is in its first or open position, the valve member blocking flow through the valve when turned into its second or closed position. Such a valve member has a neck exposed externally of the casing by which it may be turned from one position to another. The passage is provided with refrigerating means establishing a cold trap ensuring the thermal contact therewith of gas flowing through the passage. The terms "refrigerant" or "refrigerating means" as used throughout the specification and in the claims mean cryogenic as well as conventional refrigeration means facilitating servicing of the cold trap, an objective attained by providing the valve casing with sealed clean-out ports which open into the passage when the valve is closed thus permitting any required cold trap service without losing vacuum in the main chamber or elsewhere in the pumping system.

Another objective is to provide a ball valve element that is effectively sealed without materially effecting the ease with which it may be turned from one position to another, an objective attained with the valve element held centered by the neck and an aligned ball bearing unit and with the valve element provided with ribs engageable with seals encircling the ports with the ribs arranged to effect sealing in either valve position.

Other objectives of the invention will be apparent from the specification and appended claims.

BRIEF DESCRIPTION OF THE DRAWINGS

In the accompanying drawings, refrigerated valves for use in diffusion pumping systems are illustrated and FIG. 1 is a schematic view of a conventional diffusion pumping system;

FIG. 2 is a like view of such a system incorporating a refrigerated valve in accordance with the invention;

FIG. 3 is a section taken approximately along the indicated line 3—3 of FIG. 4;

THE PREFERRED EMBODIMENT OF THE INVENTION

Figure 4:
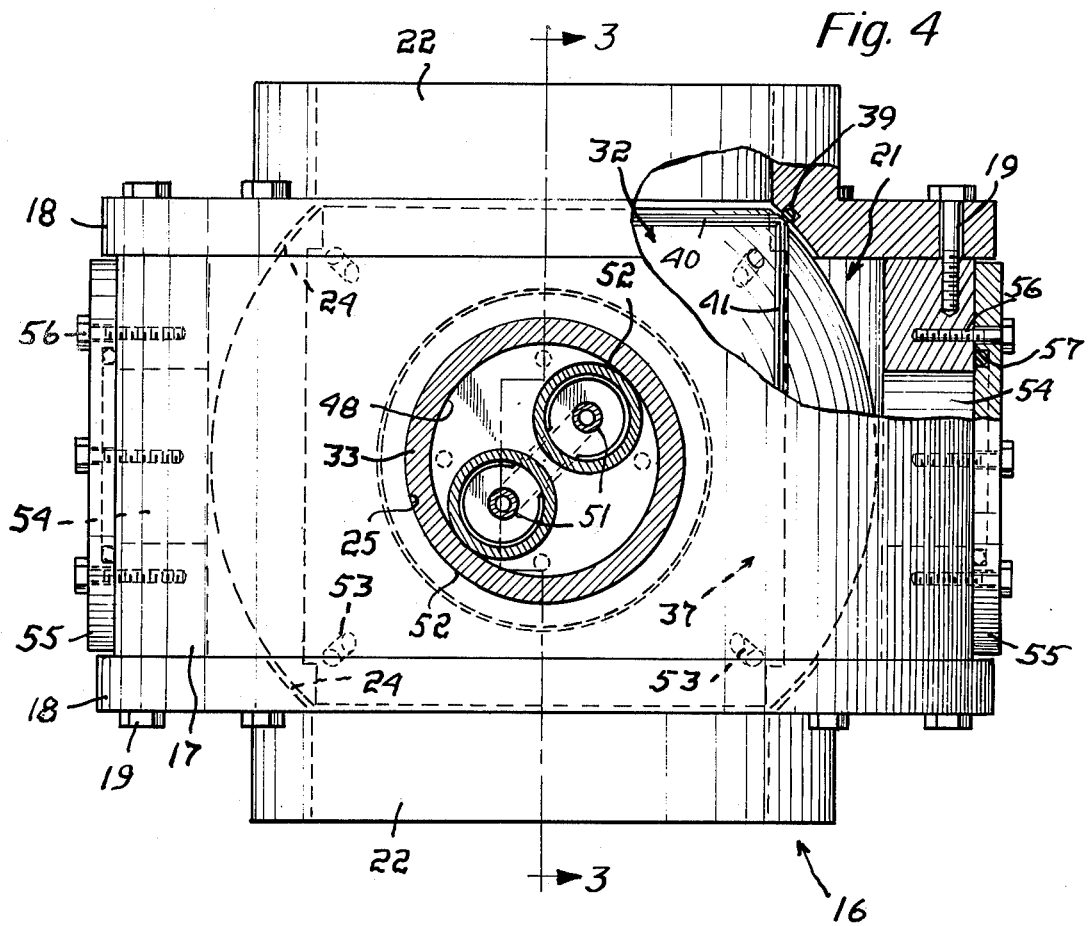
FIG. 4 is a section taken approximately along the indicated line 4—4 of FIG. 3.
Figure 5:
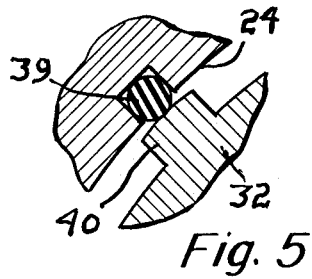
FIG. 5 is a fragmentary section, on an increase in scale, through a seal between the casing and the valve element.

Before detailing a refrigerated valve in accordance with the invention, reference is first made to high vacuum pumping systems and particularly to a conventional diffusion pumping system such as that schematically shown in FIG. 1 wherein a gate type of valve 10 is disposed between the main chamber 11 and a cold trap 12 between which and the diffusion pump 13, backed by a mechanical vacuum pump 14, is a water cooled trap 15.

In accordance with the invention and as is illustrated by FIG. 2, the gate valve 10 and the cold trap 12 in any system where a valve and a cold trap or traps are used are replaced by a refrigerated valve shown as of the ball type and generally indicated at 16.

The casing of the valve 16 includes a cylindrical section 17 having end walls 18, each secured to the section 17 by screws 19 outside an O-ring seal 20 thus providing a chamber 21. Each end wall includes a cylindrical part 22 having a port 23 opening into the chamber 21 where it is provided with a socket 24 that is arcuate with respect to the center of the chamber 21. The ports 23 are in alignment with one port 23, when the valve 16 is incorporated in the system, an inlet and the other outlet. The casing section 17 has a cylindrical port 25 having a shoulder 26 in its inner end and its axis includes the center of the chamber 21 and the centering pin 27 of a ball bearing unit 28 held in a socket 29 directly opposite the port 25 and having a service port 30 sealed by a plug 31 threaded therein.

A ball type valve element, generally indicated at 32, fits freely within the chamber 21 with diametrically opposed portions within the sockets 24. The valve element 32 includes a neck 33 fitting the port 25 and provided with a shoulder 34 that is a free fit within the shoulder 26. The port 25 carries an O-ring seal 35 in sealing engagement with the neck 33. The axis of the neck 33 passes through the center of the valve element and includes an opposite socket 36 which receives the pin 27 holding the valve element in position.

The valve element 32 has a diametrically disposed passage 37 intersecting its axis of rotation and dimensioned to enable communication to be effected between the inlet and outlet ports 23 with its end shoulders 38 defining openings of the size of the ports 23.

Each socket 24 is provided with an O-ring seal 39 and the valve element has a rib 40 surrounding and adjacent each end of the passage 37 and in engagement with the appropriate one of the seals 39 and a rib 41 interconnecting the ribs 40 and extending along the sides of the valve element in a manner such that the seals 39 are engaged by the ribs 41 as the valve member is turned 90° from the open position of the valve 16, that illustrated by FIG. 3, into its closed position and the ribs 40 are in engagement therewith in either of said positions.

In practice at least the valve element 32 is nickel coated as by a process developed by General American Transportation Corporation and identified by the trademark "Kanigen", the coating being extremely smooth and non-porous and the neck 33 is made as a separate part. The neck 33 is attached to the valve member by screws 42 threaded through the valve member into the base of the neck 33 which carries a sealing ring 43 inside of which the screws 42 are located and which are vented as by an axial bore, not shown. A sprocket 44 fixed on the exposed end of the neck enables the valve element 32 to be turned as by a rack, a fragment of which is indicated at 45 in FIG. 3.

While, as previously stated, the refrigerating means may be of a cryogenic type, such are shown as of a conventional type and includes metal plates or baffles 46 within the passage 37 the main portions of which are parallel to the flow of gas but with bent ends 47 rendering the baffles optically dense, the arrangement being such that gas flowing through the passage 37 and between the baffles 46 is in thermal contact with at least part of each of them.

The neck 33 has a recess 48 in its outer end having bores 49 each in registry, respectively with the appropriate one of the bores 50 in the valve member 32 and opening into the passage 37. A conduit 51 extends through a metal seal 52 anchored in the appropriate bore 49 and through the subjacent bore 50 and into the passage 37 where it includes a U-shaped portion with which all the plates 46 are in thermal contact and by which the plates are supported and then extends outwardly through the other port 50 and its seal 52 with the two ends of the condiut 51 connectable to corresponding flexible conduits leading to and from a refrigerant source.

In practice radial bores 53 enable any gas entrapped in the casing outside the valve element 32 to be quickly exhausted when the system is operating.

It will be noted that the casing section 17 has diametrically disposed ports 54 each closed by a plate 55 secured to the section 17 by screws 56 outside the seals 57, the ports 53 for use in purging or otherwise servicing the interior of the valve, monitoring the valve and for rough pumping the valve.

Figure 6:
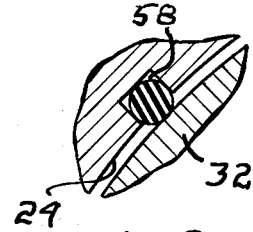
FIG. 6 is a like section through the seal between the neck of the valve element and the casing.

While the rib-to-seal construction described is advantageous the seal arrangement shown in FIG. 6 may be used to reduce machining costs, the seal receiving channel 58 desirably having outwardly and inwardly inclined walls to permit expansion of the seal 59.

I claim:

1. A valve to be installed in vacuum and like pumping systems, said valve including a casing having a chamber, a port of circular cross section opening into the chamber with its axis inclusive of the center of said chamber, and an inlet and an outlet opening into the chamber, a valve element rotatable within the chamber and including a neck extending through said port, sealing means between said casing and said neck, said valve element having a transverse passage disposed to effect connection between said inlet and outlet in a first element position and to block such connection in another position thereof, sealing means between said element and said casing, and refrigerating means within said passage and supported by said element and operable when connected to a refrigerant source to refrigerate said valve element.

2. The valve of claim 1 in which the casing has at least one port opening into the chamber in the plane occupied by the transverse passage of the valve element in either position thereof and in a position to be in communication with said passage when the valve element is in its closed position, and detachable means sealing said port, said port for clean-out, monitoring and rough pumping uses.

3. The valve of claim 1 in which the casing has diametrically opposed ports opening into the chamber in the plane occupied by the transverse passage of the valve element in either the open or the closed position thereof and in positions to be in communication with the valve element and each other in closed valve position, and detachable means sealing said ports, said ports for clean-out and monitoring and rough pumping uses.

4. The valve of claim 1 in which a ball bearing unit is supported in the chamber with its axis inclusive of the axis of the port through which the neck of the element extends and the valve element is supported by said unit.

5. The valve of claim 4 in which the ball bearing unit includes a fixed ring, a central rotor, and an axial spindle carried by the rotor and extending into the chamber and the valve element includes a radial, spindle-receiving socket.

6. The valve of claim 1 in which the valve element is of the ball type and the proximate ends of the inlet and outlet ports have seats that are arcuate with respect to the center of the ball, an annular seal in each seal and the ball element includes a rib engageable with said seals as the valve element is turned between open and closed positions.

7. The valve of claim 6 and radial ports effecting communication between the transverse passage of the element and the surface thereof.

8. The valve of the claim 6 in which the valve element includes a rib surrounding each port and ribs interconnecting said ribs one on each side of said neck and said arcuate seats include seals with which said first named seals are in engagement when the passage is in alignment with said ports and which are engaged by said second named ribs as the valve element is turned into or out of its closed position.

9. The valve of claim 1 in which the refrigerating means includes a series of metal plates within said passage spaced and arranged to effect engagement therewith of gas flowing through the passage in the first position of the element and a refrigerant conductor connectable to a refrigerant source extending inwardly through said neck into thermal contact with said plate and outwardly through said neck.

* * * * *